United States Patent [19]

Matsuo

[11] Patent Number: 5,277,165
[45] Date of Patent: Jan. 11, 1994

[54] STRATIFIED CHARGE INTERNAL COMBUSTION ENGINE WITH FUEL INJECTION TIME CONTROLLING FUNCTION

[75] Inventor: Syunsuke Matsuo, Kyoto, Japan

[73] Assignee: Mitsubishi Jidosha Kogyo Kabushiki Kaisha, Japan

[21] Appl. No.: 903,777

[22] Filed: Jun. 24, 1992

[30] Foreign Application Priority Data

Jun. 28, 1991 [JP] Japan .................. 3-185617

[51] Int. Cl.[5] ............................... F02M 51/00
[52] U.S. Cl. ...................... 123/492; 123/308
[58] Field of Search ............... 123/432, 308, 306, 302, 123/492, 478

[56] References Cited

U.S. PATENT DOCUMENTS

| | | | |
|---|---|---|---|
| 4,508,085 | 4/1985 | Yamato | 123/492 |
| 4,527,529 | 7/1985 | Suzuki et al. | 123/492 |
| 4,586,479 | 5/1986 | Isomura et al. | 123/492 |
| 4,596,221 | 6/1986 | Ament et al. | 123/501 |
| 4,612,904 | 9/1986 | Tadokoro et al. | 123/492 |
| 4,732,124 | 3/1988 | Nakamura et al. | 123/302 |
| 4,753,210 | 6/1988 | Fujimoto et al. | 123/492 |
| 4,756,292 | 7/1988 | Mischke et al. | 123/501 |
| 4,856,473 | 8/1989 | Kawai et al. | 123/308 |
| 4,899,100 | 12/1989 | Nakaniwa et al. | 123/492 |
| 5,050,557 | 9/1991 | Ishida et al. | 123/432 |

FOREIGN PATENT DOCUMENTS

| | | |
|---|---|---|
| 3540813 | 5/1987 | Fed. Rep. of Germany . |
| 59-29733 | 2/1984 | Japan . |
| 59-226242 | 12/1984 | Japan . |
| 3-23314 | 1/1991 | Japan . |
| 2061379 | 5/1981 | United Kingdom . |

OTHER PUBLICATIONS

Patent Abstracts of Japan, vol. 10, No. 216 (M-502) Jul. 29, 1986 & JP-A-61 055 3341 (Mazda Motor Corp.) Mar. 19, 1986.
Patent Abstracts of Japan, vol. 6, No. 150 (M-148) Aug. 10, 1982 & JP-A-57 068 535 (Fuji Electric Co., Ltd.) Apr. 26, 1982.
Patent Abstracts of Japan, vol. 12, No. 241 (M-716) (M-716) Jul. 8, 1988 & JP-A-63 032 123 (Mazda Motor Corp.) Feb. 10, 1988.
European Search Report.

*Primary Examiner*—E. Rollins Cross
*Assistant Examiner*—Erick Solis
*Attorney, Agent, or Firm*—Wegner, Cantor, Mueller & Player

[57] ABSTRACT

A stratified charge burning internal combustion engine with a fuel injection time controlling function wherein production of smoke upon high load operation of the engine can be reduced by control of the fuel injection time. Fuel injection time setting means sets a fuel injection end time and further sets a fuel injection start time from the fuel injection end time and a required fuel amount, and injector driving means drives an injector in accordance with the fuel injection times. Consequently, air fuel mixture and air from a pair of intake ports are flowed into the combustion chamber to make laminar tumble swirls so as to effect laminar combustion. Then, if judging means judges that the engine is operating but not in the proximity of the full load operation, then partial load time setting means sets a partial-load-time fuel injection end time, but if the judging means judges opposite, then full load time setting means sets a partial-load-time fuel injection end time to a predetermined time after starting of an intake stroke so as to reduce production of smoke.

4 Claims, 6 Drawing Sheets

INJECTION COMPLETION
TIME (°ATDC)

FIG.6

INJECTION COMPLETION
TIME (°ATDC)

FIG. 7

STRATIFIED CHARGE INTERNAL COMBUSTION ENGINE WITH FUEL INJECTION TIME CONTROLLING FUNCTION

BACKGROUND OF THE INVENTION

1. Field of the Invention

This invention relates to a stratified charge burning internal combustion engine wherein air fuel mixture and air are introduced from intake air ports into a combustion chamber such that they may make laminar tumble swirls in the combustion chamber to effect combustion of the air fuel mixture, and more particularly to a stratified charge burning internal combustion engine with a fuel injection time controlling function wherein the fuel injection end time is set differently depending upon whether or not the operating condition of the engine is in the proximity of a full load operation.

2. Description of the Prior Work

Figure 7:
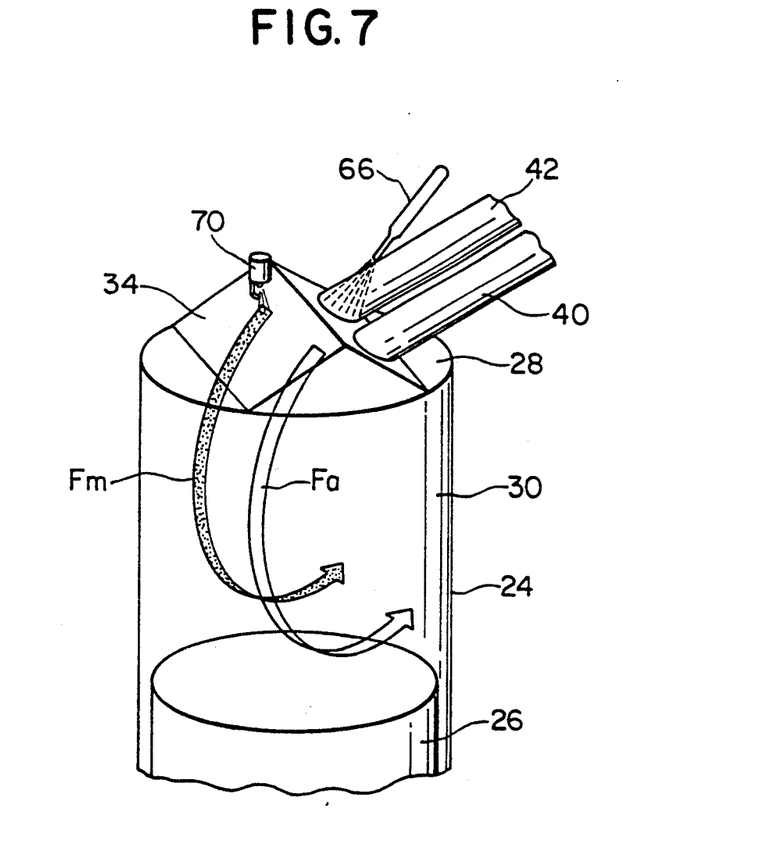
FIG. 7 is a schematic perspective view illustrating production of tumble swirls in a combustion chamber of a cylinder of a stratified charge burning internal combustion engine.

It is effective, as means for enhancing combustion of an internal combustion engine, for example, to produce, at the intake stroke, such vertical whirling flows, i.e., so-called tumble swirls, as shown in FIG. 7 in a cylinder.

FIG. 7 schematically shows structure of a cylinder of an internal combustion engine adapted to produce such tumble swirls Fa and Fm. Referring to FIG. 7, reference numeral 22 denotes a cylinder block, 24 a cylinder bore, 26 a piston, 28 a cylinder head and 30 a combustion chamber. A pentagonal roof 34 is formed at an upper wall of the combustion chamber 30, and a pair of intake ports 40 and 42 for intake air passageways are provided for each cylinder. An intake valve not shown is provided for each of the intake ports 40 and 42.

An injector 66 is disposed in the proximity of the intake port 42 such that fuel is injected from the injector 66 may be mixed into an air flow from the intake port 42 to make air fuel mixture, which is advanced into the combustion chamber 30.

The pentagonal roof 34 has such inclined faces that can guide air and air fuel mixture from the intake ports 40 and 42 downwardly along an inner wall face of the cylinder bore 24 on extension lines of axial lines of the intake ports 40 and 42.

Consequently, the flows of air and air fuel mixture from the intake ports 40 and 42 form, also by the guidance of the pentagonal roof 34, such laminar tumble swirls as indicated by arrow marks Fa and Fm, respectively, in the combustion chamber 30.

As a result, the fuel air mixture is likely burnt completely. Thus, for example, even if the air fuel ratio of the entire air and air fuel mixture is higher than the stoichiometric air fuel ratio, in short, even if the air fuel mixture as a whole is lean, the air fuel mixture can be burnt. Consequently, not only the fuel cost of the engine can be enhanced, but also reduction of hazardous exhaust substances such as CO or $NO_x$ contained in exhaust gas of the engine and prevention of knocking of the engine can be achieved.

However, such a stratified charge burning internal combustion engine as described above is disadvantageous in that, when the air fuel ratio becomes rich upon high load operation or the like, smoke is produced in the exhaust gas. The disadvantage is liable to take place particularly when fuel is injected from only one of a pair of intake ports of an internal combustion engine of the two intake valve type.

While it may seem a promising idea, as means for suppressing production of such smoke, to limit the spraying spreading angle of fuel at an injector so that fuel injected from the injector may not stick to an inner wall of an intake port, since production of smoke depends upon a burning condition of fuel in the combustion chamber, production of smoke can be reduced by a fuel injection time.

SUMMARY OF THE INVENTION

It is an object of the present invention to provide a stratified charge burning internal combustion engine with a fuel injection time controlling function wherein production of smoke upon high load operation of the engine can be reduced by control of the fuel injection time.

In order to attain the object, according to the present invention, there is provided a stratified charge burning internal combustion engine with a fuel injection time controlling function wherein two intake ports are provided for each of a plurality of cylinders of the internal combustion engine and an injector which is controlled to be opened at a predetermined time is provided for one of the intake ports such that air fuel mixture and air are flowed from the intake ports into the combustion chamber so as to form laminar tumble swirls in the combustion chamber to effect combustion of the air fuel mixture, comprising fuel injection time setting means for setting a fuel injection end time and setting a fuel injection start time from the thus set fuel injection end time and a required fuel amount, injector driving means for driving the injector in accordance with the fuel injection times set by the fuel injection time setting means, and judging means for judging whether or not the operation condition of the internal combustion engine is in the proximity of a full load operation, the fuel injection time setting means comprising partial load time setting means for setting a partial-load-time fuel injection end time when it is judged by the judging means that the operation condition of the internal combustion engine is not in the proximity of the full load operation, and full load time setting means for setting a full-load-time fuel injection end time different from the partial-load-time fuel injection end time when it is judged by the judging means that the operation condition of the internal combustion engine is in the proximity of the full load operation. the full load time setting means setting the full-load-time fuel injection end time to a predetermined time after starting of an intake stroke so as to reduce production of smoke which is liable to take place upon full load operation of the internal combustion engine.

In the stratified charge burning internal combustion engine with a fuel injection time controlling function of the present invention, the fuel injection time setting means sets a fuel injection end time and sets a fuel injection start time from the thus set fuel injection end time and a required fuel amount, and the injector driving means drives the injector in accordance with the fuel injection times thus set so that fuel is injected from the injector. Consequently, air fuel mixture and air from the intake ports are flowed into the combustion chamber such that they may make laminar tumble swirls so that the air fuel mixture is ignited in a laminar condition. In this instance, if it is judged by the judging means that the operation condition of the internal combustion engine is not in the proximity of the full load operation, then the partial load time setting means sets a partialload-time fuel injection end time, but on the contrary if it is judged by the judging means that the operation condition of the internal combustion engine is in the proximity of the full load operation, then the full load time setting means sets a full-load-time fuel injection end time. Then, since the full load time setting means sets the full-load-time fuel injection end time to a predetermined time after starting of an intake stroke so as to reduce production of smoke and the injector is driven in accordance with the full-load-time fuel injection end time thus set, production of smoke in exhaust gas when the internal combustion engine is in the proximity of the full load operation is reduced.

Preferably, the fully open time setting means of the full-load-time fuel injection time setting means sets a fuel injection end time, when it is judged by the judging means that the operation condition of the internal combustion engine is in the proximity of the full load operation, to a predetermined time within a range from a crank angle of 60° or so after the piston top dead center upon starting of an intake stroke to another crank angle of 120° or so after the piston top dead center. Since the fuel injection end time when the operation condition of the internal combustion engine is in the proximity of the full load operation is set by the full load time setting means of the fuel injection time setting means to the predetermined time within the range from the crank angle of 60° or so after the piston top dead center upon starting of an intake stroke to the crank angle of 120° or so after the piston top dead center, production of smoke is reduced with higher certainty.

Preferably, the partial load time setting means of the fuel injection time setting means sets a fuel injection end time for a partial load operation condition, when it is judged by the judging means that the operation condition of the internal combustion engine is not in the proximity of the full load operation, to a predetermined time within another range from a crank angle of 60° or so before the piston top dead center upon starting of an intake stroke to another crank angle of 100° or so after the piston top dead center. Since the partial-load-time fuel injection end time for a partial load operation condition when the operation condition of the internal combustion engine is not in the proximity of the full load operation is set by the partial load time setting means of the fuel injection time setting means to the predetermined time within the range from the crank angle of 60° or so before the piston top dead center upon starting of an intake stroke to the crank angle of 100° or so after the piston top dead center, combustion upon partial load operation of the internal combustion engine takes place in a good condition.

Preferably, a partial-load-time fuel injection end time set by the partial load time setting means of the fuel injection time setting means is set on a side advanced in crank angle relative to another fuel injection end time set by the full load time setting means. In this instance, preferably a fuel injection end time set by the full load time setting means of the fuel injection time setting means is a predetermined time within a range from a crank angle of 60° or so after the piston top dead center upon starting of an intake stroke to another crank angle of 120° or so after the piston top dead center, and another fuel injection end time set by the partial load time setting means is a predetermined time within another range from a crank angle of 60° or so before the piston top dead center upon starting of the intake stroke to another crank angle of 100° or so after the piston top dead center. Since the fuel injection end time set by the partial load time setting means of the fuel injection time setting means is set on a side advanced in crank angle relative to the fuel injection end time set by the full load time setting means, NOx in exhaust gas upon partial load operation of the internal combustion engine is reduced.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENT

Figure 1:
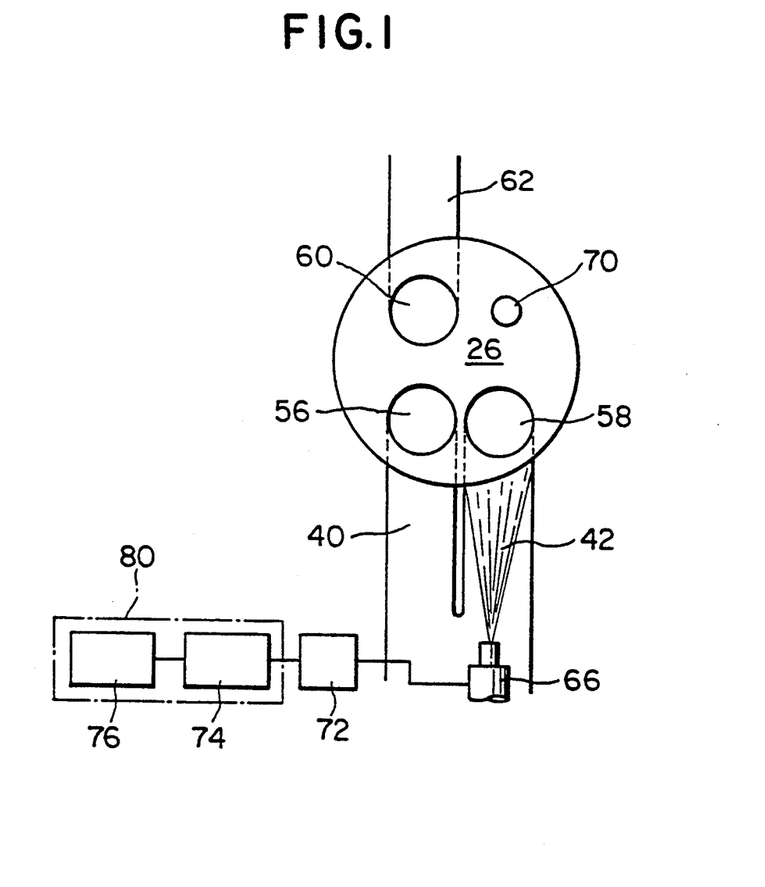
FIG. 1 is a schematic plan view showing construction of a combustion chamber of a cylinder and associated elements of a stratified charge burning internal combustion engine with a fuel injection time controlling function to which the present invention is applied.

Referring first to FIG. 1, there is provided a combustion chamber of one of cylinders and associated element of a stratified charge burning internal combustion engine to which the present invention is applied. The stratified charge burning internal combustion engine is provided, for example, on an automobile not shown, and each cylinder thereof has general structure substantially similar, for example, to that shown in FIG. 7. Thus, portions which are not shown in FIG. 1 will be described with reference to FIG. 7.

Thus, referring to FIGS. 1 and 7, each cylinder of the internal combustion engine has a combustion chamber 30 defined by a cylinder bore 24 formed in a cylinder block 22, a piston 26 and a cylinder head 28. Intake ports 40 and 42 extend into the combustion chamber 30, and intake valves 56 and 58 are provided in the intake ports 40 and 42, respectively. Reference numeral 60 denotes an exhaust valve, and 62 an exhaust port.

It is to be noted that a pentagonal roof 34 (refer to FIG. 7) has such inclined faces that can guide air and air fuel mixture from the intake ports 40 and 42 downwardly along an inner wall face of the cylinder bore 24 on extension lines of axial lines of the intake ports 40 and 42, respectively.

An injector 66 is provided only for the intake port 42 as shown in FIG. 1, and an ignition plug 70 is disposed in the proximity of the intake port 42 which is thus provided with the injector 66. Consequently, fuel injected from the injector 66 is mixed into an air flow from the intake port 42 to make air fuel mixture, which is advanced into the combustion chamber 30.

The injector 66 is driven by an injector driver (injector driving means) 72. The injector driver 72 drives the injector 66 in accordance with a fuel injection time which is set by fuel injection time setting means 74.

The fuel injection time setting means 74 is provided, for example, in an electronic control unit (ECU) 80 which executes various controls of the engine such as control of an ignition timing. The fuel injection time setting means 74 thus sets a fuel injection end time and further sets a fuel injection start time in accordance with the thus set fuel injection end time and a required fuel amount.

It is to be noted that the required fuel amount is an amount of fuel to be injected from the injector 66 in each combustion cycle, and it can be adjusted by a driving time of the injector 66 (valve opening time). Then, the valve opening time of the injector 66 is calculated from an engine speed Ne and an intake air amount. To this end, detection information from an engine speed sensor (not shown) and an intake air amount sensor (air flow sensor) (not shown) are transmitted to the ECU 80.

Here, the fuel injection time setting means 74 calculates a basic driving time of the injector 66 from the engine speed Ne and the intake air amount and corrects the thus calculated basic driving time in accordance with a temperature of cooling water including such an increasing correction when the engine is in a cold condition (water temperature increasing correction), an increasing correction upon and after starting of the engine or an increasing correction after idling to determine a driving time of the injector 66. Then, the fuel injection time setting means 74 converts the thus determined driving time of the injector 66 into a crank angle.

Further, the fuel injection time setting means 74 reads one of preset fuel injection end times stored in a ROM (not shown) of the ECU 80 to set a fuel injection end time and then reversely calculates a fuel injection start time from the thus set fuel injection end time and the injector driving time after conversion into the crank angle. In short, a point of time prior to the fuel injection end time by the injector driving time is set as a fuel injection start time.

Two different values are set for each fuel injection end time in the ROM of the ECU 80 including a fuel injection end time for normal operation, that is, for partial load operation of the engine and another fuel injection end time for full load operation or operation in the proximity of the full load operation of the engine.

The fuel injection end time for partial load operation is set to a point of time within a range from a crank angle of 60° or so before the top dead center of the piston upon starting of an intake stroke (60° BTDC) to another crank angle of 100° or so after the top dead center (100° ATDC), for example, to a point of time at which combustion takes place completely.

On the other hand, the fuel injection end time for full load operation is set to a point of time within another range from a crank angle of 60° or so after the top dead center of a piston upon starting of an intake stroke (60° ATDC) to another crank angle of 120° or so after the top dead center (120° ATDC), for example, to a point of time at which production of smoke in exhaust gas is reduced.

Here, the fuel injection end time for partial load operation is set to 40° or so after the piston top dead center (40° ATDC), and a fuel injection end time for full load operation is set to 120° or so after the piston top dead center (120° ATDC).

It is to be noted that, if only lean combustion is considered, then the fuel injection end time for partial load operation should preferably be retarded further than 40° after the piston top dead center. The reason why nevertheless the fuel injection end time for partial load operation is set to that value is that, if the fuel injection end time is early in this manner, then a rise in pressure and temperature upon combustion can be reduced so that production of NOx ca be reduced remarkably. It is to be noted that the value of 40° after the piston top dead center to which the fuel injection end time for partial load operation is set is sufficiently effective for an effect of lean combustion, in short, for a fuel cost reducing effect.

Further, describing the fuel injection end time for partial load operation, when the internal combustion engine is provided with an exhaust emission control apparatus such as a catalyzer for sufficiently reducing NOx in exhaust gas, the effect of lean combustion can be enhanced if the fuel injection end time is retarded further than 40° after the piston top dead center. In this connection, describing a relationship between the fuel injection end time for partial load operation and the fuel injection end time for full load operation, if reduction of NOx in exhaust gas is considered, then it has been confirmed by experiments that preferably the fuel injection end time upon partial load operation is earlier than the fuel injection end time upon fully open operation. Anyway, however, the fuel injection end time for partial load operation is determined taking an effect of lean combustion into consideration and further, if necessary, taking reduction of NOx into consideration, and the fuel injection end time for full load operation is determined taking reduction of smoke into consideration.

Figure 2:
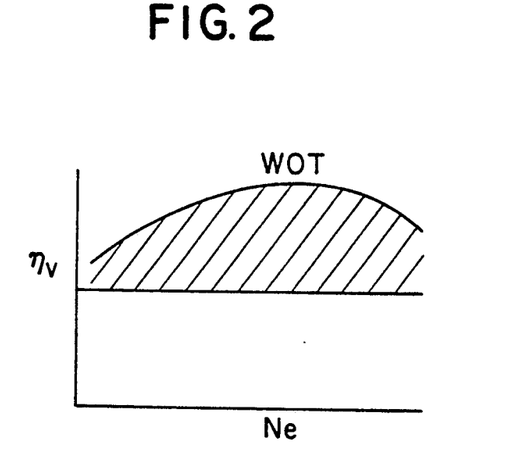
FIG. 2 is a graph showing a full load operation zone of the volume efficiency of the stratified charge burning internal combustion engine of FIG. 1.

Judgment whether the operation condition of the engine is a partial load operation or a full load operation is performed by judging means 76 provided in the ECU 80. The judging means 76 judges that, if, for example, a current volumetric efficiency is within a full load operation zone (WOT zone) in which the volumetric efficiency is higher than a predetermined volumetric efficiency $\eta_v$ ($\eta_v$ is a fixed value) in the proximity of the full load volumetric efficiency (WOT) as shown in FIG. 2, then the engine is in a fully open operation condition, but if the current volumetric efficiency is not within the WOT zone, then the judging means 76 judges that the engine is operating in a partial load operation condition. It is to be noted that a volumetric efficiency can be calculated from an intake air amount or the like.

Since the stratified charge burning internal combustion engine with a fuel injection time controlling function of the embodiment of the present invention is constructed in such a manner as described above, flows of air and air fuel mixture from the intake ports 40 and 42 form such laminar tumble swirls as indicated by the arrow marks Fa and Fm, respectively, (refer to FIG. 7) in the combustion chamber 30, which promotes complete combustion of the air fuel mixture. Thus, even if, for example, the air fuel ratio of the entire air and air fuel mixture is higher than the stoichiometric air fuel ratio (in short, even if the air fuel mixture as a whole is lean), combustion of the air fuel mixture is permitted, which improves the gas mileage of the engine and besides achieves reduction of hazardous exhaust substances such as CO and NOx contained in exhaust gas of the engine and prevention of knocking of the engine.

Particularly, since the fuel injection time setting means 74 sets, upon partial load operation wherein the operation of the engine is not in the proximity of the full load operation, the fuel injection end time (partial injection end time) to a point of time at which combustion is performed completely so as to enhance the efficiency of the engine, the effects described above can be achieved with certainty.

On the other hand, since the fuel injection time setting means 74 sets, when the air fuel ratio becomes rich upon high load operation or the like, the fuel injection end time such that smoke may not be produced in exhaust gas and then fuel injection is performed in accordance with the thus set air fuel ratio, smoke is not likely produced in exhaust gas.

Figure 3:
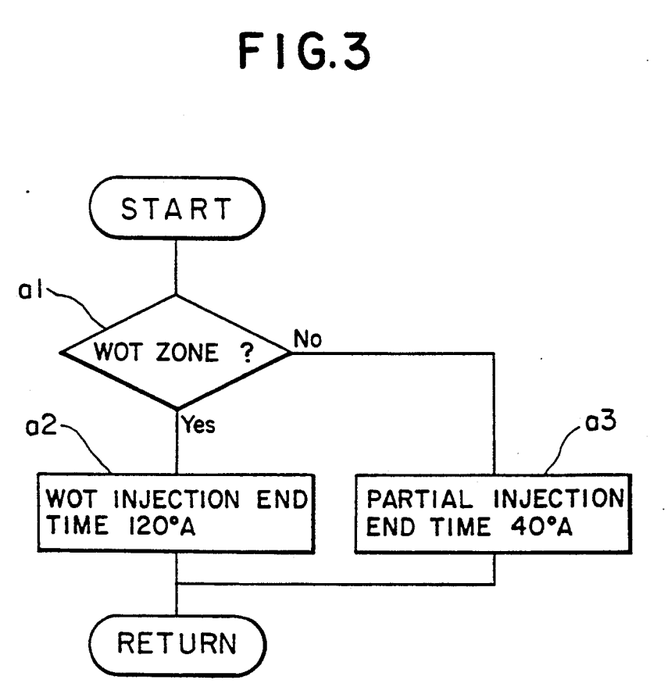
FIG. 3 is a flow chart showing a flow of control for setting an injection end time in fuel injection time control of the stratified charge burning internal combustion engine of FIG. 1.

In short, operation of the fuel injection time setting means 74 is illustrated in FIG. 3. Referring to FIG. 3, first at step a1, the judging means 76 of the fuel injection time setting means 74 judges from a volumetric efficiency whether or not the engine is in the WOT zone (in the full load operation condition). If the engine is in the WOT zone, then the fuel injection setting means 74 sets a WOT injection end time (for example, 120° ATDC) as a fuel injection end time at step a2, but on the contrary if the engine is not in the WOT zone, then the fuel injection setting means 74 sets a partial injection end time (for example, 40° ATDC) as a fuel injection end time at step a3.

Figure 4:
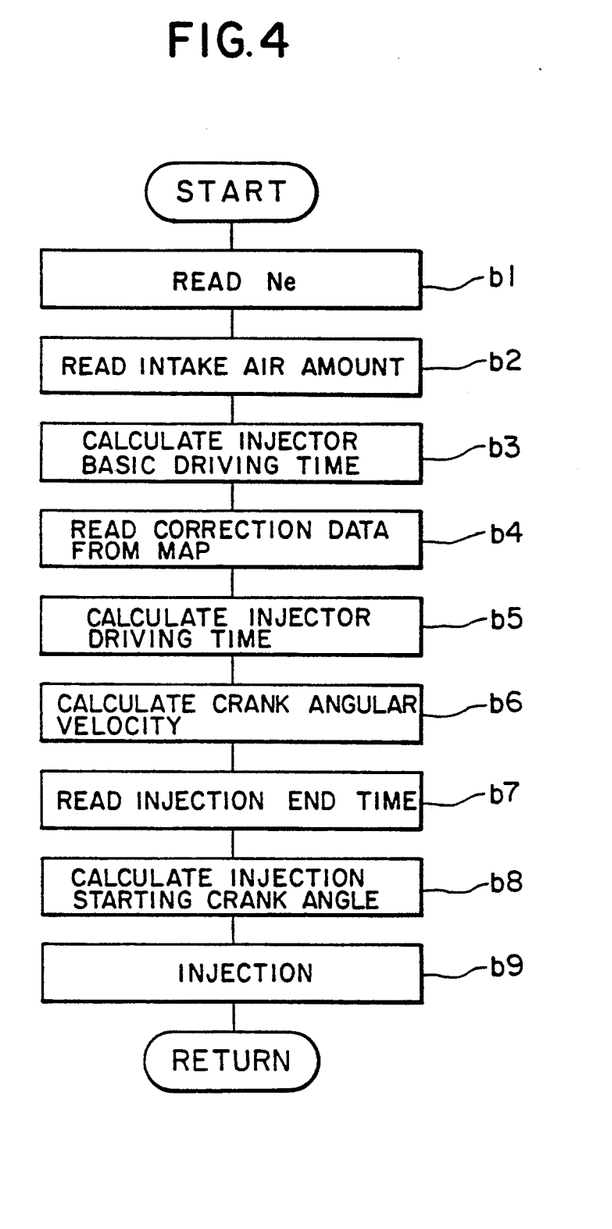
FIG. 4 is a flow chart showing a flow of the fuel injection time control of the stratified charge burning internal combustion engine of FIG. 1.

Then, fuel injection time control is executed, for example, as illustrated in FIG. 4. Referring to FIG. 4, an engine speed Ne is read in first at step b1, and then an intake air amount is read in at step b2, whereafter a basic driving time of the injector 66 is calculated at step b3.

Subsequently, correction data are read in from a map (MAP) at step b4, and using the correction data, a correction of the basic driving time such as a water temperature increasing correction, an increasing correction upon or after starting or an increasing correction after idling is performed at step b5.

Further, the driving time of the injector 66 obtained by the correction of the basic driving time is converted into a crank angle at step b6. Then, a fuel injection end time set as described above in connection with the flow chart of FIG. 3 is read in at step b7, and then at step b8, a fuel injection start time is calculated reversely from the fuel injection end time by the driving time of the injector 66 after conversion into a crank angle.

The injector 66 is driven in response to the fuel injection start time and fuel injection end time thus set to perform injection of fuel.

As a result, production of smoke when the air fuel ratio becomes rich such as upon high load operation of the engine is reduced, which is effective for purification of exhaust gas.

It is to be noted that, the fuel injection end time, in short, the WOT injection end time, when the air fuel ratio becomes rich depends upon characteristics of the internal combustion engine and is thus set to a value in accordance with the characteristics.

Figure 5:
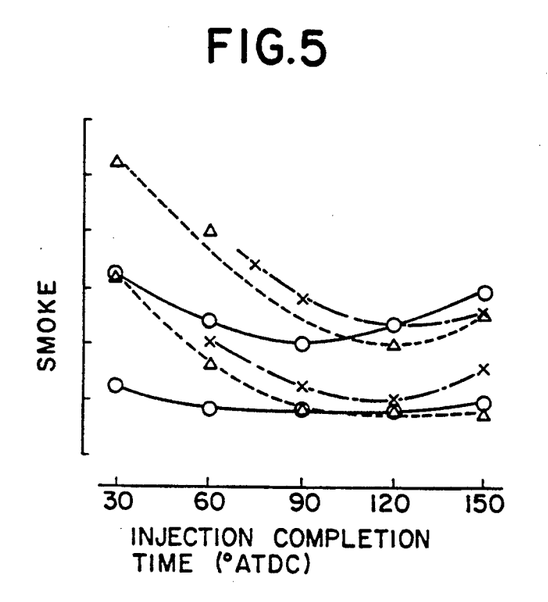
FIG. 5 is a graph showing an example of smoke production characteristic of the stratified charge burning internal combustion engine of FIG. 1.
Figure 6:
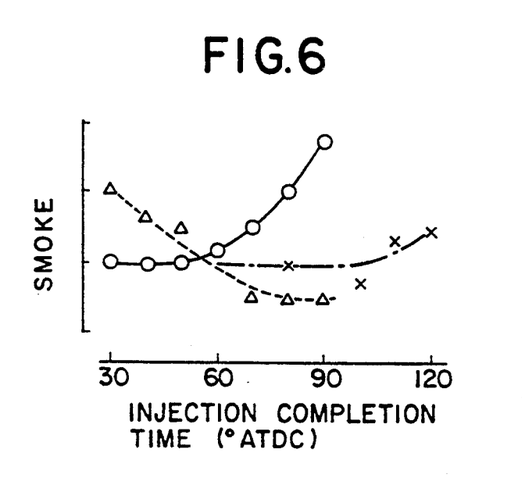
FIG. 6 is a graph showing another example of smoke production characteristic of the stratified charge burning internal combustion engine of FIG. 1.

For example, FIGS. 5 and 6 show smoke production characteristics of certain internal combustion engines. In FIGS. 5 and 6, O indicates data at the engine speed of 1,000 rpm; Δ indicates data at the engine speed of 2,000 rpm; and X indicates data at the engine speed of 3,000 rpm, and a solid line indicates a characteristic curve obtained from the data of O; a broken line indicates a characteristic curve obtained from the data of Δ; and an alternate long and short dash line indicates a characteristic curve obtained from the data of X. In FIG. 5, the data (O, Δ, X) shown at an upper portion are data when the air fuel ratio (A/F) is 11, and the data (O, Δ, X) shown at a lower portion are data when the air fuel ratio (A/F) is 12.5. Meanwhile, the data (O, Δ, X) shown in FIG. 6 are data when the air fuel ratio (A/F) is 11.

The internal combustion engine in the present embodiment has such characteristics as illustrated in FIG. 5. From FIG. 5, it can be seen that smoke presents its minimum when the fuel injection end time is at or around 120° ATDC. Accordingly, it can be seen that, if the fuel injection end time when the air fuel ratio becomes rich is set to a value equal to or around the 120° ATDC, then smoke in exhaust gas can be minimized.

On the other hand, with an internal combustion engine having such characteristics as illustrated in FIG. 6, smoke is small in amount when the fuel injection end time is at or near 60° ATDC, and if the fuel injection end time when the air fuel ratio becomes rich is set to such time (at or around 60° ATDC), then smoke in exhaust gas can be minimized.

It is to be noted that naturally it is a promising idea to provide, in addition to such control of a fuel injection end time as described above, means for reducing production of smoke by limiting the spraying spreading angle at the injector so that fuel injected from the injector may not stick to an inner wall of the intake port, and in this instance, a higher smoke reducing effect can be anticipated.

It is to be noted that, while a fuel injection end time for reducing production of smoke is set, in the embodiment described above, when the volumetric efficiency of the engine is within the WOT zone, such setting is performed from the point of view that, when the volumetric efficiency is within the WOT zone, also the air fuel ratio of air fuel mixture becomes rich with fuel and production of smoke likely increases.

The setting of a fuel injection end time for reduction of smoke may be performed based on an excess air ratio. For example, a condition wherein the excess air ratio is lower than 1.0 is regarded as a rich condition, and in such rich condition, the fuel injection end time is set to a fuel injection end time for reduction of smoke.

Further, the WOT zone described above corresponds to a condition wherein the excess air ratio is lower than 1.0, and the volumetric efficiency $\eta v$ which defines a lower limit of the WOT zone is set to a value substantially equal to 80% of the volumetric efficiency of the WOT.

Or else, an aimed fuel injection end time may be set to a fuel injection end time for reduction of smoke when the volumetric efficiency is within the WOT zone and the excess air ratio is lower than 1.0.

As described in detail so far, since, according to the present invention, a stratified charge burning internal combustion engine with a fuel injection time controlling function wherein two intake ports are provided for each of a plurality of cylinders of the internal combustion engine and an injector which is controlled to be opened at the intake stroke at the cylinder is provided for one of the intake ports such that air fuel mixture and air are flowed from the intake ports into the combustion chamber so as to form laminar tumble swirls in the combustion chamber to effect combustion of the air fuel mixture is constructed such that it comprises fuel injection time setting means for setting a fuel injection end time and setting a fuel injection start time from the thus set fuel injection end time and a required fuel amount, injector driving means for driving the injector in accordance with the fuel injection times set by the fuel injection time setting means, and judging means for judging whether or not the operation condition of the internal combustion engine is in the proximity of the full load operation, the fuel injection time setting means comprising partial load time setting means for setting a partial-load-time fuel injection end time when it is judged by the judging means that the operation condition of the internal combustion engine is not in the proximity of the full load operation, and full load time setting means for setting a fuel injection end time when it is judged by the judging means that the operation condition of the internal combustion engine is in the proximity of the full load operation, the full load time setting means setting the full-load-time fuel injection end time to a predetermined time after starting of an intake stroke so as to reduce production of smoke which is liable to take place upon full load operation of the internal combustion engine, production of smoke in exhaust gas upon high load operation of the stratified charge burning internal combustion engine can be reduced. Consequently, an effect that exhaust gas can be purified is achieved.

When the full load time setting means of the fuel injection time setting means is constructed such that it sets a fuel injection end time when it is judged by the judging means that the volumetric efficiency of the internal combustion engine is in the proximity of the full load operation to a predetermined time within a range from a crank angle of 60° or so after the piston top dead center upon starting of an intake stroke to another crank angel of 120° or so after the piston top dead center, an exhaust gas purifying effect by reduction of production of smoke is achieved with higher certainty.

Further, when the partial load time setting means of the fuel injection time setting means is constructed such that it sets a fuel injection end time for a partial load operation condition when it is judged by the judging means that the volumetric efficiency of the internal combustion engine is not in the proximity of the full load operation to a predetermined time within another range from a crank angle of 60° or so before the piston top dead center upon starting of an intake stroke to another crank angle of 100° or so after the piston top dead center, combustion upon partial load operation of the internal combustion engine takes place in a good condition and the performance of the internal combustion engine is improved.

Further, when the stratified charge burning internal combustion engine with a fuel injection time controlling function is constructed such that a fuel injection end time set by the partial load time setting means of the fuel injection time setting means is set on a side in crank angle relative to another fuel injection end time set by the full load time setting means, and particularly when, in this condition, a fuel injection end time set by the full load time setting means is a predetermined time within a range from a crank angle of 60° or so after the piston top dead center upon starting of an intake stroke to another crank angle of 120° or so after the piston top dead center and another fuel injection end time set by the partial load time setting means is a predetermined time within another range from a crank angle of 60° or so before the piston top dead center upon starting of the intake stroke to another crank angle of 100° or so after the piston top dead center, an exhaust gas purifying effect by suppression of production of smoke is obtained in the full load operation condition of the internal combustion engine, but in the partial load operation condition of the internal combustion engine, lean combustion is performed in a good condition while reducing production of NOx remarkably.

What is claimed is:

1. A stratified charge burning internal combustion engine with a fuel injection time controlling function wherein two intake ports are provided for each of a plurality of cylinders of said internal combustion engine and an injector which is controlled to be opened at a predetermined time is provided for one of said intake ports such that air fuel mixture and air are flowed from said intake ports into the combustion chamber so as to form laminar tumble swirls in said combustion chamber to effect combustion of the air fuel mixture, comprising:

fuel injection time setting means for setting a fuel injection end time and setting a fuel injection start time from the thus set fuel injection end time and a required fuel amount;

injector driving means for driving said injector in accordance with the fuel injection times set by said fuel injection time setting means; and judging means for judging whether or not the operation condition of said internal combustion engine is in the proximity of a full load operation;

said fuel injection time setting means comprising partial load time setting means for setting a partial-load-time fuel injection end time when it is judged by said judging means that the operation condition of said integral combustion engine is not in the proximity of the full load operation, and full load time setting means for setting a full-load-time fuel injection end time different from the partial-load-time fuel injection end time when it is judged by said judging means that the operation condition of said internal combustion engine is in the proximity of the full load operation, said full load time setting means setting the full-load-time fuel injection end time to a predetermined time after starting of an intake stroke so as to reduce production of smoke which is liable to take place upon full load operation of said internal combustion engine said fuel injection end time set by said partial load time setting means of said fuel injection time setting means is set on a side advanced in crank angle relative to another fuel injection end time set by said full load time setting means.

2. A stratified charge burning internal combustion engine with a fuel injection time controlling function as claimed in claim 1, wherein said full load time setting means of said fuel injection time setting means sets a fuel injection end time, when it is judged by said judging means that the operation of said internal combustion engine is in the proximity of the full load operation, to a predetermined time within a range from a crank angle of approximately 60° after the piston top dead center upon starting of an intake stroke to another crank angle of approximately 120° after the piston top dead center.

3. A stratified charge burning internal combustion engine with a fuel injection time controlling function as claimed in claim 2, wherein said partial load time setting means of said fuel injection time setting means sets a fuel injection end time for a partial load operation condition, when it is judged by said judging means that the operation condition of said internal combustion engine is not in the proximity of the full load operation, to a predetermined time within another range from a crank angle of approximately 60° before the piston top dead center upon starting of an intake stroke to another crank angle of approximately 100° after the piston top dead center.

4. A stratified charge burning internal combustion engine with a fuel injection time controlling function as claimed in claim 1, wherein a fuel injection end time set by said full load time setting means of said fuel injection time setting means is a predetermined time within a range from a crank angle of approximately 60° after the piston top dead center upon starting of an intake stroke to another crank angle of approximately 120° after the piston top dead center, and another fuel injection end time set by said partial load time setting means is a predetermined time within another range from a crank angle of approximately 60° before the piston top dead center upon starting of the intake stroke to another crank angle of approximately 100° after the piston top dead center.

* * * * *